No. 737,510. Patented August 25, 1903.

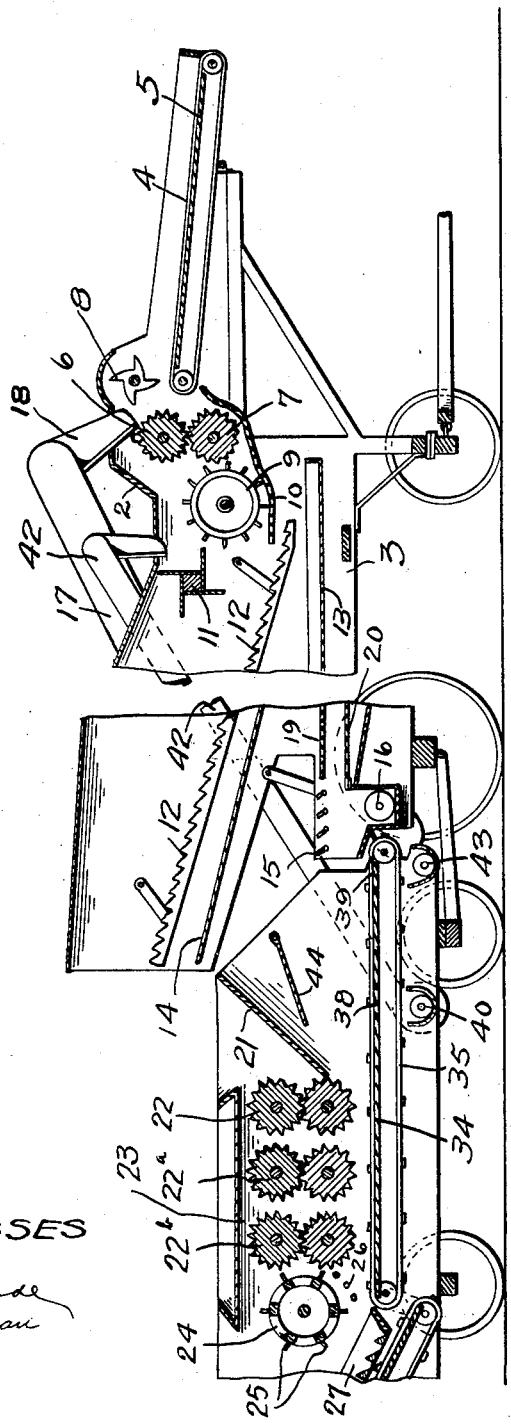

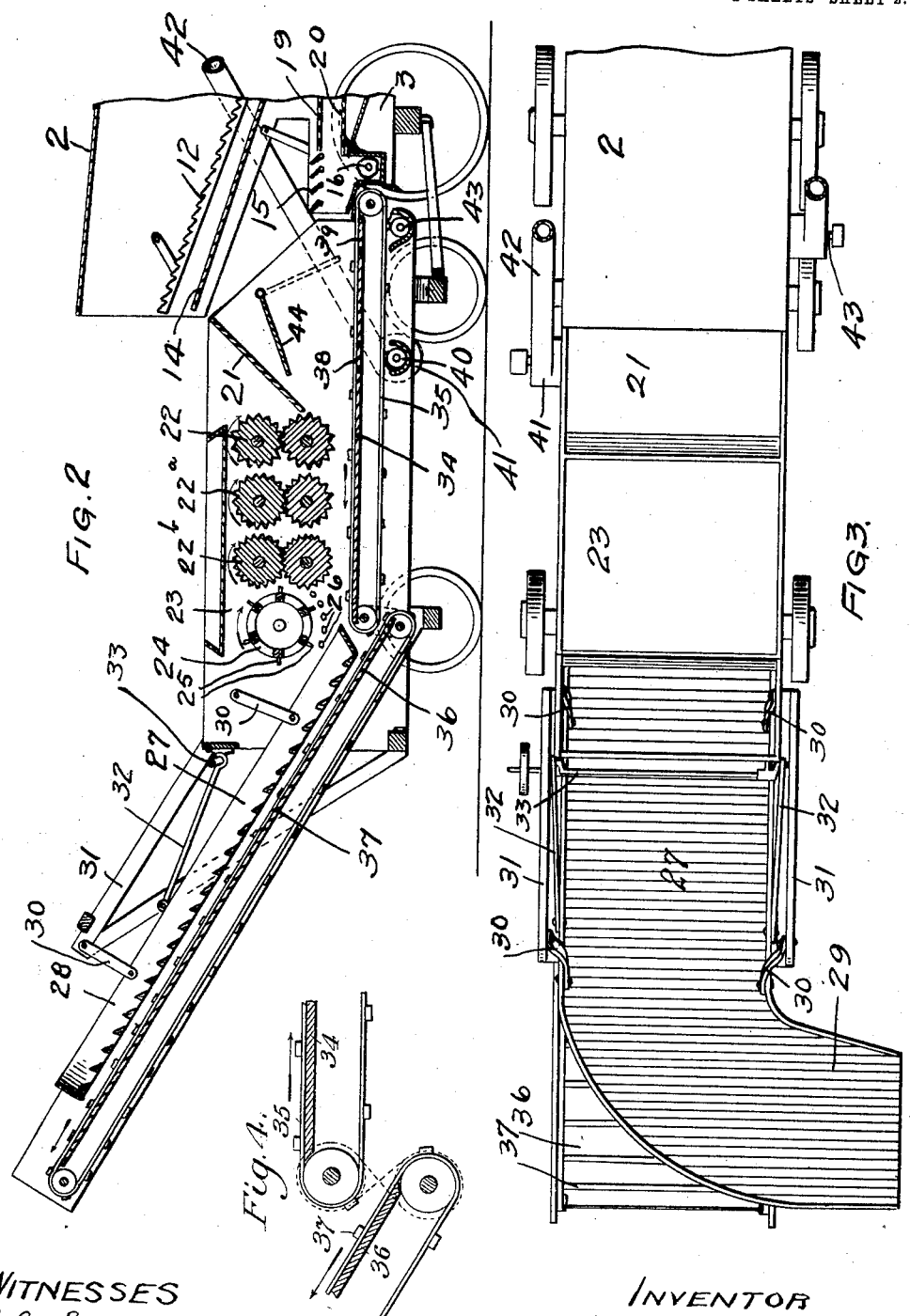

UNITED STATES PATENT OFFICE.

JOHN T. SMITH, OF HERON LAKE, MINNESOTA.

MACHINE FOR BREAKING FLAX-BOLLS AND PRESERVING THE SEEDS.

SPECIFICATION forming part of Letters Patent No. 737,510, dated August 25, 1903.

Application filed January 2, 1902. Serial No. 88,015. (No model.)

*To all whom it may concern:*

Be it known that I, JOHN T. SMITH, of Heron Lake, Jackson county, Minnesota, have invented certain new and useful Improvements in Machines for Breaking Flax-Bolls and Preserving the Seeds, of which the following is a specification.

The object of this invention is to provide a machine wherein the flax or hemp straw may be passed successively and continuously through the threshing, breaking, and cleaning and crushing operation for the purpose of removing the woody portions of the fiber and separating and preserving the seeds.

A further object is to provide a machine wherein the crushers and carriers operate in the same direction to move the straw, seeds, and refuse material toward a common point to the end that less mechanism will be required to receive the material in its separated condition and comparatively little power be required to operate the machine.

Other objects of the invention will appear from the following detailed description:

The invention consists generally in various constructions and combinations, all as hereinafter described, and particularly pointed out in the claims.

In the accompanying drawings, forming part of this specification, Figure 1 is a longitudinal section of a flax and hemp straw treating apparatus embodying my invention. Fig. 2 is a similar view of the rear end of the machine. Fig. 3 is a plan view of the same. Fig. 4 is a detailed section showing the means in dotted lines for reversing the direction of movement of the seed-moving carrier.

In the drawings, 2 represents a casing mounted upon a suitably-wheeled frame 3, wherein the threshing mechanism is arranged. 4 is a carrier operating over a closed floor 5 and adapted to deliver the straw to corrugated crushing-rolls 6 and 7, the former being supported in vertically-movable bearings to allow the rolls to separate and permit the straw to pass between them. Above the inner end of the carrier 4 is a band-cutter 8, composed of a series of knives of the usual construction, and near said crushing-rolls is a threshing-cylinder 9, beneath which is a concave 10. A beater 11 is arranged in said casing near said cylinder, and beneath said beater is a shaking straw-rack 12, whereon the straw is thrown after leaving the cylinder. Beneath the straw-rack is a grain-pan 13, on which the seeds and fine material falls from said rack, being directed thereto by an inclined floor 14.

15 represents the rakes near the end of the grain-pan, beneath which is a transverse screw conveyer 16. The discharge end of said conveyer communicates with a repeat-elevator 17, having a spout 18 adapted to deliver the chaff and seeds to the threshing-cylinder, from whence the material will pass through the straw-rack and cleaning mechanism a second time.

Near the conveyer 16 are screens 19 and 20, through which a current of air is maintained from a blast-fan. (Not shown.)

The mechanism above described is substantially the same as that belonging to an ordinary threshing-machine and forms no part of my invention, except in combination with other devices. I have therefore for convenience of illustration omitted the middle portion of the thresher in order that the essential parts of the connected apparatus may be more clearly illustrated.

Beneath the discharge end of the straw-rack is a feed-board 21, that is adapted to receive the straw and direct it to a series of crushing-rolls 22, 22$^a$, and 22$^b$. These rolls break up the woody portions of the fiber, crushing the unbroken seed-bolls, and separate the seeds therefrom and from the loose straw. They are mounted in a suitable casing 23, supported upon a wheeled frame and located when in operation near the discharge end of the straw-rack. After leaving the crushing-rolls the straw is engaged by a revolving beater 24, provided with a series of fingers 25, which toss up and separate the straw, shaking the unbroken bolls and the loose seeds therefrom. Beneath the picker is a grating 26, which prevents the straw from working back beneath the rolls. After leaving the picker the straw falls upon an upwardly-inclined shaker 27, having a slatted bottom and side boards 28 to keep the material on the shaker. This shaker at its upper end has an outwardly-turned discharge portion 29, from which the straw is delivered to the baling-press or falls upon the ground or upon a wagon. The shaker is supported by any suitable means, as links 30, suspended on the casing of the machine, and a frame 31 and is oscillated by means of a link 32, provided on a crank-shaft 33. The chaff, seeds, and unbroken bolls separated by the crushing-rolls fall upon a floor 34, over which an open slatted carrier 35 is adapted to operate. This conveyer extends back near the rakes 15 to receive the short straw and chaff therefrom and also the material that is separated from the seeds as they pass over the sieves. The discharge end of the carrier 35 is located over an upwardly-inclined floor 36, that extends beneath the shaker 27, and over the floor 36 a second carrier 37 operates to carry the chaff and short straw out of the machine. This carrier also receives the chaff and short straw that is shaken out by the movement of the shaker.

The floor 34 is provided with two slides 38 and 39. Beneath the slide 38 is a transverse screw conveyer 40, communicating on one side of the machine with a fan 41 and a spout 42, through which the chaff may be carried back to the receiving end of the straw-rack. Beneath the slide 39 is a similar screw conveyer 43, communicating in a similar manner with a spout on the opposite side of the machine. In the ordinary use of the machine the conveyer 35 will be operated to carry the chaff, seeds, and fine material toward the carrier 37, so that all the moving parts of the crushing and cleaning mechanism will operate in the same direction, and in practice I prefer to drive the cleaning and carrying devices in this way. It may happen, however, that the person in charge of the machine may wish to run the chaff from the crushing-rolls back through the cleaning mechanism again, and to do so it is only necessary to reverse the direction of movement of the carrier 35 by twisting the belt that connects the operating mechanism of the carriers 35 and 37, remove the slide 38, when all the chaff from the crushers will be delivered to the transverse conveyer 40 and pass from thence to the straw-rack. It may also be desirable to repeat the cleaning operation of the chaff and other material that comes over the rakes 15 upon the carrier 35, and in such case I may remove the slide 39 and allow the chaff and seeds to drop into the conveyer 43, a swinging gate 44 being provided near the slide 39 to prevent the chaff and fine material from being driven among the crushers by the current of air from the fan.

I claim as my invention—

1. In a machine for treating flax and hemp straw, the combination, with a shaking straw-rack, of the seed-pan and rakes located beneath said rack and whereto the chaff and seeds are delivered, crushing-rolls near the discharge end of said rack to receive the straw therefrom and crush the woody portions and the unbroken seed-bolls, a floor beneath said crushing-rolls and provided near said rakes with a discharge-opening, a slide normally closing said discharge-opening, a slatted carrier operating over said floor, a swinging gate provided above said floor near said discharge-opening, and a repeat apparatus whereto the chaff from said rakes is delivered and returned to the receiving end of said straw-rack.

2. The combination, with a straw-rack and the seed-cleaning devices, of crushing-rolls, a floor beneath said rolls having a transversely-arranged discharge-opening near the receiving side of said rolls and imperforate directly under them, a repeat-elevator connected with said discharge-opening, a shaker having its receiving end in position to receive the material from said rolls, a carrier-belt beneath said shaker and having its receiving end beneath the discharge end of said floor, a second carrier operating over said floor and arranged to be moved in one direction over said floor to deliver the material thereon to said discharge-opening or in the other direction to deliver the material to said first-named carrier.

3. The combination, with a straw-rack, and the seed-cleaning devices, of crushing-rolls, means beneath said rolls to receive and move the chaff and seeds loosened thereby either forward or backward, a shaker near the discharge side of said rolls, a conveyer-belt beneath said shaker and having its receiving end in position to receive the chaff and seeds from said moving means when it is operated in one direction, and an elevating device connected with said moving means and adapted when said means is operated in the opposite direction from said carrier-belt to receive the seeds and chaff and deliver them to the receiving end of said straw-rack.

4. The combination, with a straw-rack and the seed-cleaning devices, of crushing-rolls provided near the discharge end of said rack, a floor beneath said rolls provided with a transverse discharge-opening, a slatted carrier operating over said floor, an adjustable gate provided above said floor near said discharge-opening, and a repeat apparatus connected with said discharge-opening.

5. The combination, with a threshing-machine straw-rack, of crushing-rolls adapted to receive the straw from the discharge end of said rack, a floor beneath said crushing-rolls, a slide normally closing a discharge-opening in said floor, a slatted carrier operating over said floor, a transverse conveyer beneath said discharge-opening, and an elevating device connected with said conveyer.

6. The combination, with a threshing-machine straw-rack, of a series of crushing-rolls near the discharge end of said rack, a floor beneath said rolls having a narrow transversely-arranged discharge-slot near the receiving side of said rolls and being imperforate directly beneath them, a slatted carrier operating over said floor, and an elevating device connected with said discharge-opening and whereto the chaff and seeds loosened by said rolls are delivered and returned to the receiving end of said straw-rack.

7. The combination, with a threshing-machine straw-rack, of crushing-rolls provided near the discharge end of said rack, a floor beneath said rolls having a transversely-arranged discharge-slot near the receiving side of said rolls and being imperforate directly beneath them, means for normally closing said discharge-slot, a slatted carrier operating over said floor, and an elevating device connected with said discharge-slot.

8. The combination, with a threshing-machine straw-rack, of crushing-rolls located near the discharge end of said rack, means beneath said rolls for moving the seed and chaff discharged therefrom toward the receiving side of said rolls, and an elevating device communicating with the receiving end of said straw-rack and arranged to receive the material from said seed and chaff moving means, substantially as described and for the purpose specified.

9. A machine of the class described, comprising in combination, crushing-rolls, a floor beneath said rolls having a transversely-arranged discharge-slot near the receiving side of said rolls and being imperforate beneath said rolls, and seed and chaff moving means operating over said floor for receiving the seed and chaff from said rolls and advancing it toward said discharge-slot.

In witness whereof I have hereunto set my hand this 12th day of December, 1901.

JOHN T. SMITH.

In presence of—
JENNIE SMITH,
CARL MEYER.